United States Patent
Saito et al.

(10) Patent No.: US 6,226,428 B1
(45) Date of Patent: May 1, 2001

(54) OPTICAL MULTIPLEXER/DEMULTIPLEXER WITH OPTICAL WAVEGUIDES AND A DIFFRACTION GRATING

(75) Inventors: Takashi Saito; Yutaka Urino, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/120,087

(22) Filed: Jul. 21, 1998

(30) Foreign Application Priority Data

Jul. 30, 1997 (JP) .................................................. 9-203690

(51) Int. Cl.[7] ............................... G02B 6/28; G02B 6/34
(52) U.S. Cl. ................................. 385/42; 385/24; 385/37
(58) Field of Search .................................. 385/4, 10, 14, 385/24, 30, 31, 37, 39, 42, 50

(56) References Cited

U.S. PATENT DOCUMENTS

| | | | |
|---|---|---|---|
| 5,195,161 | * 3/1993 | Adar et al. | 385/129 |
| 5,457,758 | * 10/1995 | Snitzer | 385/30 |
| 5,459,801 | * 10/1995 | Snitzer | 385/30 |
| 5,574,807 | * 11/1996 | Snitzer | 385/24 |
| 5,636,309 | * 6/1997 | Henry et al. | 385/129 |
| 5,832,154 | * 11/1998 | Uetsuka et al. | 385/37 |
| 5,956,442 | * 9/1999 | Byron | 385/37 |

FOREIGN PATENT DOCUMENTS

| | | |
|---|---|---|
| 55-161203 | 12/1980 | (JP) . |
| 56-159610 | 12/1981 | (JP) . |
| 58-51247 | 11/1983 | (JP) . |
| 59-84205 | 5/1984 | (JP) . |
| 61-248009 | 11/1986 | (JP) . |
| 61-284708 | 12/1986 | (JP) . |
| 63-174002 | 7/1988 | (JP) . |
| 1-172924 | 7/1989 | (JP) . |
| 3-46603 | 2/1991 | (JP) . |
| 6-308546 | 11/1994 | (JP) . |
| 9-61649 | 7/1997 | (JP) . |

OTHER PUBLICATIONS

Baumann et al., "Compact All–Fiber Add–Drop Multiplexer Using Fiber Bragg Gratings", IEEE Photonics Technology Letters, vol. 8, No. 10, Oct. 1996, pp. 1331–1333.*

Sauer et al., "Novel compact dual–channel all–fiber Bragg grating multiplexer", OFC '97 Technical Digest, 1997, pp. 283–284.*

"IEEE Photonics Technology Letters", vol. 8 (10) (Oct. 1996), pp. 1331–1333.

* cited by examiner

Primary Examiner—John D. Lee
Assistant Examiner—Michelle R. Connelly-Cushwa
(74) Attorney, Agent, or Firm—Scully, Scott, Murphy & Presser (57) ABSTRACT

An optical circuit device includes a directional coupling section and at least one diffraction grating. The directional coupling section is comprised of first and second optical waveguides and having a length n times (n is an integer equal to or larger than two) the minimum length required to completely couple light inputted to the first optical waveguide with the second optical waveguide. The diffraction grating is formed in the directional coupling section and has a specific reflection characteristic. When input light beams having different wavelengths are inputted to the input side of the first optical waveguide, light having a reflection wavelength in the diffraction grating is demultiplexed/outputted to the input side of the second optical waveguide. Light beams having other wavelengths are outputted to the output side of the first or second optical waveguide. When the light having the reflection wavelength in the diffraction grating is inputted through one of the output sides of the first and second optical waveguides from which the light beams having other wavelengths are not outputted, the light having the reflection wavelength input through the output side of the optical waveguide is multiplexed with the output light beams having other wavelengths.

8 Claims, 8 Drawing Sheets

OPTICAL MULTIPLEXER/DEMULTIPLEXER WITH OPTICAL WAVEGUIDES AND A DIFFRACTION GRATING

BACKGROUND OF THE INVENTION

1. Field of the Invention

The present invention relates to an optical circuit device and, more particularly, to an optical circuit device having a multi/demultiplexing function suitable for wavelength division multiplexing optical communication.

2. Description of the Prior Art

With recent increases in information transmission capacity, wavelength division multiplexing (WDM) optical communication that transmits different pieces of information using different wavelengths has come to the forefront of the technology. Research institutes are engaged in vigorous research and development of devices for multiplexing and demultiplexing wavelengths as key devices in WDM.

Of such devices, arrayed-waveguide gratings (AWGS) have been developed by various research institutes, and have recently exhibited great technical advances. An AWG has satisfactory characteristics for wavelength multi/demultiplexing on a single device. However, the device size is large, and the cost is high. For this reason, the AWG can be suitably used as a device for a trunk line system, but is not suitable for a subscriber system.

A Mach-Zehnder (MZ) optical multi/demultiplexer and an optical demultiplexer using directional coupler have also been proposed. In the former device, diffraction gratings are formed on two arms of a balanced MZ interferometer to implement a multi/demultiplexing function. This device is described in detail in Japanese Unexamined Patent Publication Nos. 9-61649 and 1-172924. The latter device is described in detail in I. Baumann et al., "Compact All-Fiber Add-Drop-Multiplexer Using Fiber Bragg Gratings" (IEEE PHOTONICS TECHNOLOGY LETTERS Vol. 8, No. 10, pp. 1331–1333 (1996).

Figure 1:
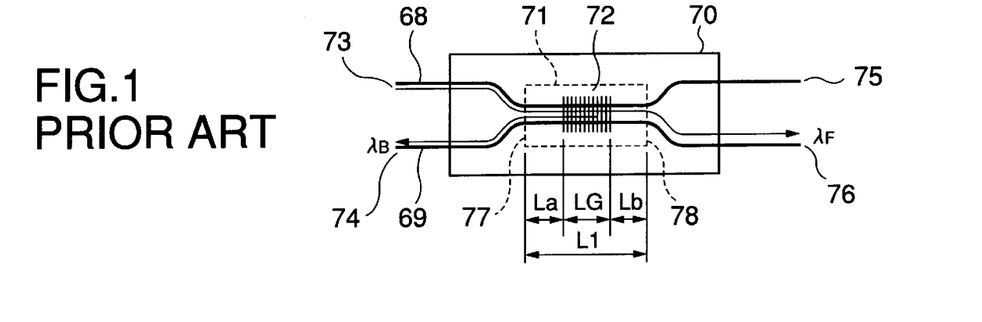
FIG. 1 is a plan view showing the schematic arrangement of a conventional optical demultiplexer using a directional coupling section.

FIG. 1 is a plan view showing the schematic arrangement of a conventional optical demultiplexer using a directional coupler. In the optical device shown in FIG. 1, first and second fibers 68 and 69 as single-mode fibers are held nearby on a substrate 70 to form a directional coupling section 71.

A diffraction grating 72 is formed on the directional coupling section 71 by using optically induced refractive index modulation upon ultraviolet irradiation, thereby implementing an optical demultiplexer.

When light beams having different wavelengths are inputted through an input port 73, since a length L of the directional coupling section 71 is equal to the complete coupling length, light of the wavelength transmitted through the diffraction grating 72 is outputted from an output port 76.

In this case, the "complete coupling length" is the minimum length that is required to completely couple light inputted to the first optical waveguide (first fiber 68) with the second optical waveguide (second fiber 69).

Letting κc be the coupling coefficient of the directional coupling section 71, a complete coupling length L1 is given by:

$$L1 = \pi/2/\kappa c \qquad (1)$$

Light having the wavelength reflected by the diffraction grating 72 is output from a demultiplexing port 74.

Figure 2:
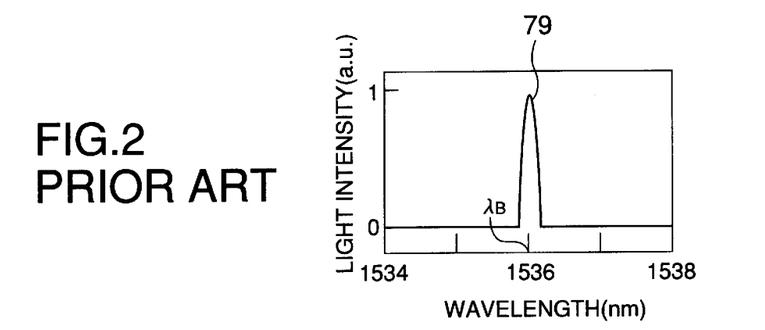
FIGS. 2 and 3 are graphs showing light intensity versus wavelength characteristics to explain the operation of the optical demultiplexer in FIG. 1.
Figure 3:
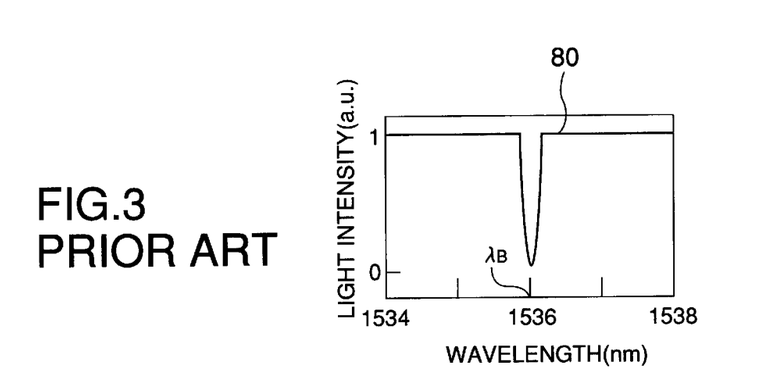

FIGS. 2 and 3 are graphs showing light intensity/wavelength characteristics to explain the operation of the conventional optical demultiplexer. FIGS. 2 and 3 respectively show a demultiplexing port output waveform 79 and an output port output waveform 80 at the demultiplexing port 74 and an output port 76 when broadband light is input through the input port 73.

A Bragg wavelength λB of the diffraction grating 72 is 1,536 nm. In the conventional optical circuit device, the diffraction grating 72 is placed at a distance La from a start position 77 of the directional coupling section 71 to minimize reflection loss of light having the wavelength λB at the input port 73.

More specifically, the position La of the diffraction grating 72 is set so that:

$$4 \times \kappa c \times La + d\phi = \pi \qquad (2)$$

where dφ is the phase difference between the even and odd modes of light having the wavelength λB reflected by the diffraction grating 72. Equation (2) indicates that the phase difference between the even and odd modes of light having the wavelength λB becomes π when the light is reflected by the diffraction grating and returns to the start position 77.

In this case, the even mode indicates a case in which the phase difference between light beams propagating in two waveguides is 0, whereas the odd mode indicates that the phase difference between light beams propagating in two waveguides is π.

Ideally, reflection loss at the input port 73 can be perfectly suppressed by satisfying equation (2). In the prior art, L1=10 mm, LG=2.5 mm, λB=1536 nm, and the refractive index modulation of the diffraction grating 72: Δn=1.3×10⁻³, and the diffraction grating is formed at La=4.7 mm.

In the conventional optical circuit device, to add a multiplexing function, light having the wavelength λB inputted through a port 75 must be multiplexed with the output from the output port 76.

The reflection loss at the port 75 is, however, large because the phase difference between the even and odd modes of light having the wavelength λB does not become π when the light inputted through the port 75 is reflected by the diffraction grating 72 and returns to a terminal position 78 of the directional coupling section 71.

In the prior art, a distance Lb between the terminal position 78 of the directional coupling section 71 and the diffraction grating 72 is 2.8 mm, and the phase difference between the even and odd modes of light having the wavelength λB is 0.62·π when the light returns to the terminal position 78. In this case, 32% of the light is lost by reflection loss at the port 75.

As described above, the conventional optical circuit device using the directional coupling section 71 has satisfactory demultiplexing characteristics for demultiplexing of light having a specific wavelength, but has difficulty in multiplexing the wavelength again. This is because the diffraction grating is shifted from the center of the directional coupling section to obtain satisfactory demultiplexing characteristics.

SUMMARY OF THE INVENTION

The present invention has been made in consideration of the above situation, and has as its object to provide an optical circuit device using a directional coupler and having excellent demultiplexing and multiplexing functions.

In order to achieve the above object, according to the principal aspect of the present invention, there is provided an optical circuit device comprising a directional coupling section composed of first and second optical waveguides and having a length n times (n is an integer not less than two) a minimum length required to completely couple light inputted to the first optical waveguide to the second optical waveguide, and at least one diffraction grating formed in the directional coupling section and having a specific reflection characteristic, wherein when input light beams having different wavelengths are inputted to an input side of the first optical waveguide, light having a reflection wavelength in the diffraction grating is demultiplexed/output to an input side of the second optical waveguide, and light beams having other wavelengths are outputted to an output side of the first or second optical waveguide, whereas when the light having the reflection wavelength in the diffraction grating is inputted through one of the output sides of the first and second optical waveguides from which the light beams having other wavelengths are not outputted, the light having the reflection wavelength inputted through the output side of the optical waveguide is multiplexed with the output light beams having other wavelengths.

According to another aspect of the present invention, the device according to the principal aspect further includes a mask layer having an opening in that portion on the optical waveguide in which the diffraction grating is formed.

According to the present invention, since the length of the directional coupling section is n times the complete coupling length, the diffraction grating can be placed in the center of the directional coupling section. Therefore, not only demultiplexing but also multiplexing can be performed.

In addition, according to the present invention, since the position where a diffraction grating is to be formed can be accurately determined by the mask layer having the opening, an optical multi/demultiplexer having little characteristics deterioration can be realized.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF PREFERRED EMBODIMENTS

Several preferred embodiments of the present invention will be described below with reference to the accompanying drawings.

Figure 4:
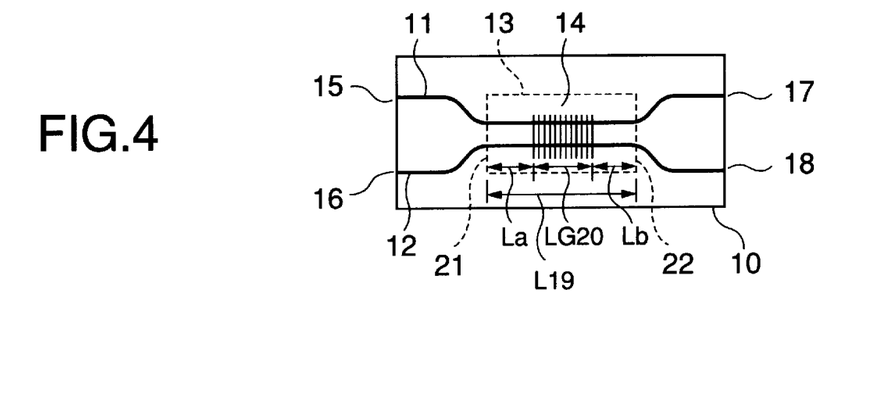
FIG. 4 is a plan view showing the schematic arrangement of the embodiment as the best mode of the present invention.

FIG. 4 is a plan view showing the schematic arrangement of an optical circuit device according to the embodiment as the best mode of the present invention.

The optical circuit device of the present invention includes two waveguides 11 and 12. This circuit has a directional coupling section 13 having a length L19 which is n (n is an integer equal to or larger than 2) times the complete coupling length. A diffraction grating 14 for reflecting light having a specific wavelength is formed in the center of the optical circuit device.

The optical circuit device of the present invention has four input/output ports 15 to 18. Letting K and c be the coupling coefficients of the two waveguides 11 and 12, a length L19 of the directional coupling section 13 is given by:

$$L19 = n \times \pi/2/\kappa c \qquad (3)$$

Assume that the port to which light beams having different wavelengths are inputted is the first port 15, the other port on the input side is the second port 16, and the ports located at the "through" and "cross" positions with respect to the first port are the third and fourth ports 17 and 18, respectively. In this case, the light transmitted through the diffraction grating 14 is outputted to the third portion 17 if n is an even number. If n is an odd number, this light is outputted to the fourth port 18.

The diffraction grating 14 is placed in the center of the directional coupling section 13 and has a length LG20 given by:

$$2 \times \kappa c \times (L19 - LG20) + d\phi = \pi \qquad (4)$$

$$La = Lb = (L19 - LG20)/2 \qquad (5)$$

where La and Lb are the distance from a start position 21 of the directional coupling section 13 to the diffraction grating 14 and the distance from a terminal position 22 of the directional coupling section 13 to the diffraction grating 14, respectively, and $d\phi$ is the phase difference between the even mode and odd mode of the light reflected by the diffraction grating 14. The light having a wavelength $\lambda B$ inputted through the first port 15 ($\lambda B$ is the wavelength reflected by the diffraction grating 14) passes through the directional coupling section 13 and is reflected by the diffraction grating 14. As a result, the light returns to the input side.

If the condition represented by equation (5) is satisfied, the phase difference between the even and odd modes when light having the wavelength $\lambda B$, which is inputted through the first port 15, returns to the start position 21 of the directional coupling section 13 becomes $\pi$. Consequently, the light inputted to the first port 15 is demultiplexed/outputted from the second port 16 with minimum reflection loss.

If the condition represented by equation (4) is satisfied, the diffraction grating 14 is placed in the center of the directional coupling section 13. With this arrangement, the input and the output sides become symmetrical. Even if, therefore, light having the wavelength λB is inputted from the output side, the phase difference between the even and odd modes when the light returns to the terminal position 22 of the directional coupling section 13 becomes π.

In the optical circuit device according to the present invention, if n is an even number, when light having the wavelength λB is inputted through the fourth port 18, the light is multiplexed with the output from the third port 17. If n is an odd number, when light having the wavelength λB is inputted through the third port 17, the light is multiplexed with the output from the fourth port 18.

In addition, in the optical circuit device of the present invention, two diffraction gratings may be formed to be symmetrical about the center of the directional coupling section. In this case, a distance La from the start position of the directional coupling section to the first diffraction grating and a distance Lb from the terminal position of the directional coupling section to the second diffraction grating are respectively set to obey equation (2) above and relations (6) and (7) below:

$$Lb=La \quad (6)$$

$$La+LG<L/2 \quad (7)$$

Even with the use of the two diffraction gratings, an optical multiplexer having a satisfactory multi/demultiplexing function can be implemented (to be described later in detail with reference to FIG. 9).

The second embodiment of the present invention will be described next. In this embodiment, a length L19 of a directional coupling section 13 is twice a complete coupling length L1. That is, n=2.

Figure 5:
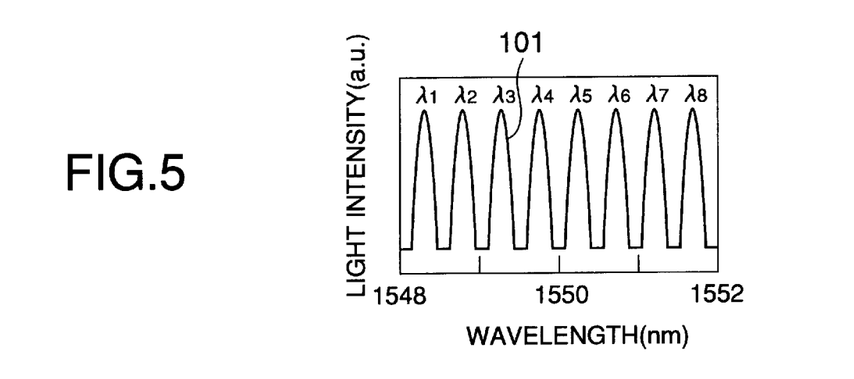
FIGS. 5 to 8 are graphs showing the operation of the second embodiment of the present invention.
Figure 6:
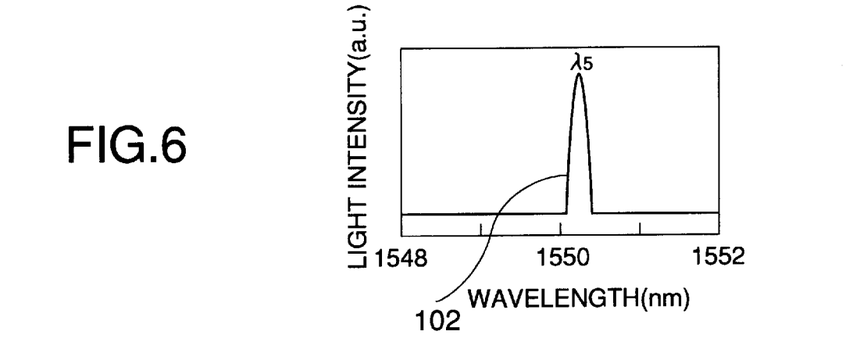
Figure 7:
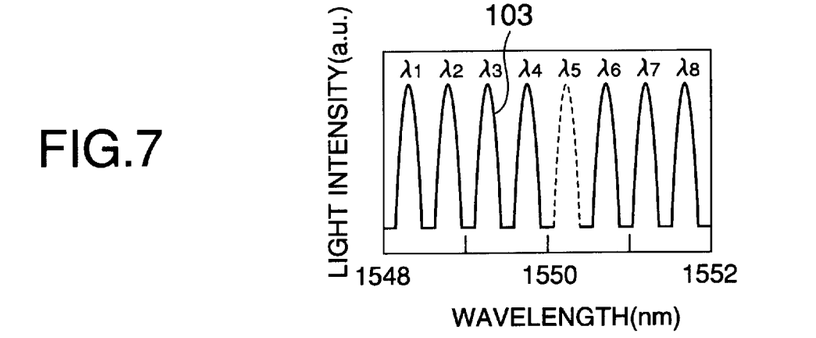
Figure 8:
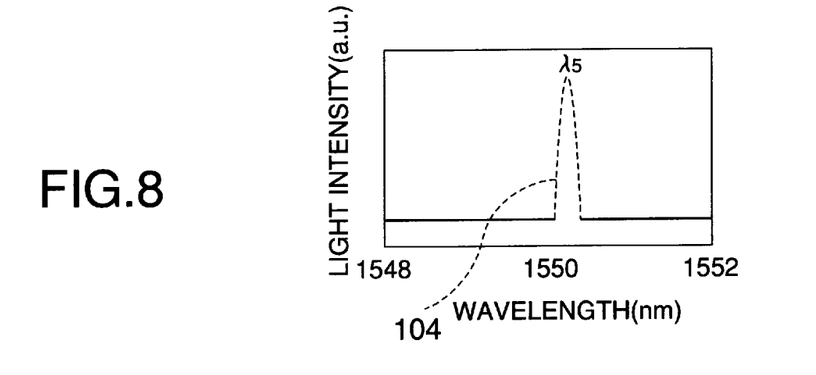

FIGS. 5 to 8 are graphs showing the operation of the second embodiment. FIG. 5 is a graph showing a waveform 101 of light beams having wavelengths λ1 to λ8, which are inputted to a first port 15. FIG. 6 is a graph showing a waveform 102 of light having the wavelength λ5, which is outputted from a second port 16. FIG. 7 is a graph showing a waveform 103 of light beams having the wavelength λ1 to λ8, which are outputted from a third port 17. FIG. 8 is a graph showing a waveform 104 of light having the wavelength λ5, which is inputted to a fourth port 18.

A reflection wavelength λB of a diffraction grating 14 is set to be equal to the wavelength λ5. Of the light beams inputted to the first port 15, the light beam having the wavelength λ5 is reflected by the diffraction grating 14 and is demultiplexed/outputted from the second port 16.

The light beams other than the light beam having the wavelength λ5 are transmitted through the diffraction grating 14 and outputted from the third port 17 because the directional coupling section 13 has a length twice the complete coupling length.

The light having the wavelength λ5 inputted through the fourth port 18 is multiplexed with the output light from the third port 17.

In the second embodiment, multiplexing and demultiplexing are performed with respect to one wavelength. With the use of a diffraction grating having a plurality of reflection wavelength characteristics, light beams having different wavelengths can be simultaneously multiplexed/demultiplexed.

The third embodiment of the present invention will be described next. FIG. 9 is a plan view showing the schematic view of the third embodiment. In this embodiment, a length L20 of a directional coupling section 25 is three times a complete coupling length L1, and a diffraction grating is made up of first and second diffraction gratings 26 and 27.

Figure 9:
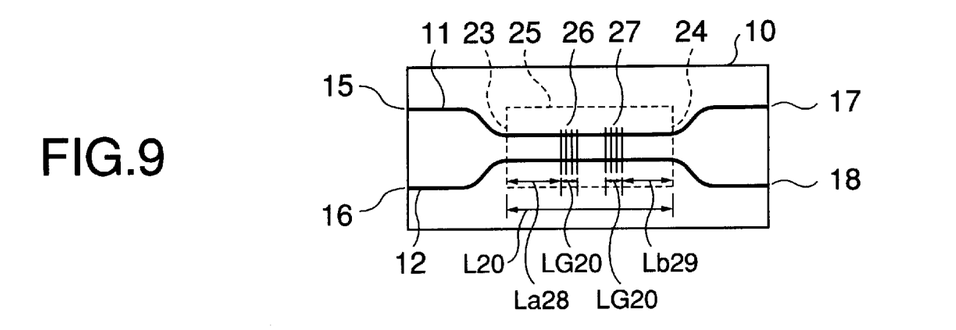
FIG. 9 is a plan view showing the schematic arrangement of the third embodiment of the present invention.

The same reference numerals in FIG. 9 denote the same parts as those in FIG. 4, and a description thereof will be omitted.

Letting λB be the Bragg wavelength of the first and second diffraction gratings 26 and 27, a distance La28 from a start position 23 of the directional coupling section 25 to the first diffraction grating 26 and a distance Lb29 from a terminal position 24 of the directional coupling section 25 to the second diffraction grating 27 are set according to equations (2) and (6).

Figure 10:
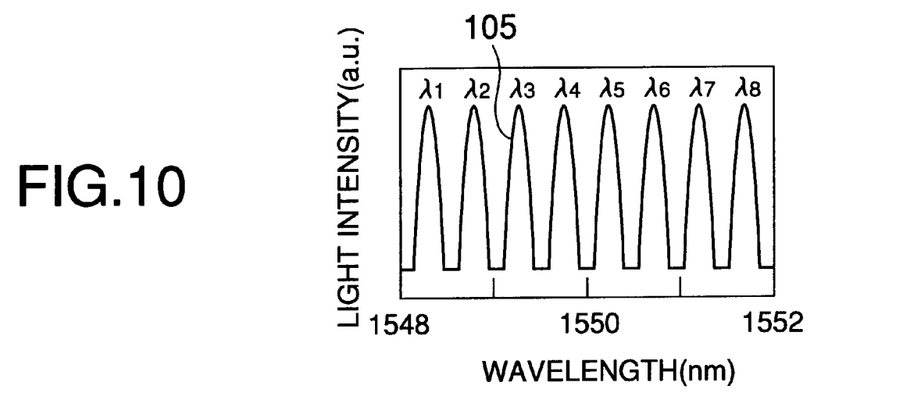
FIGS. 10 to 13 are graphs showing the operation of the third embodiment of the present invention.
Figure 11:
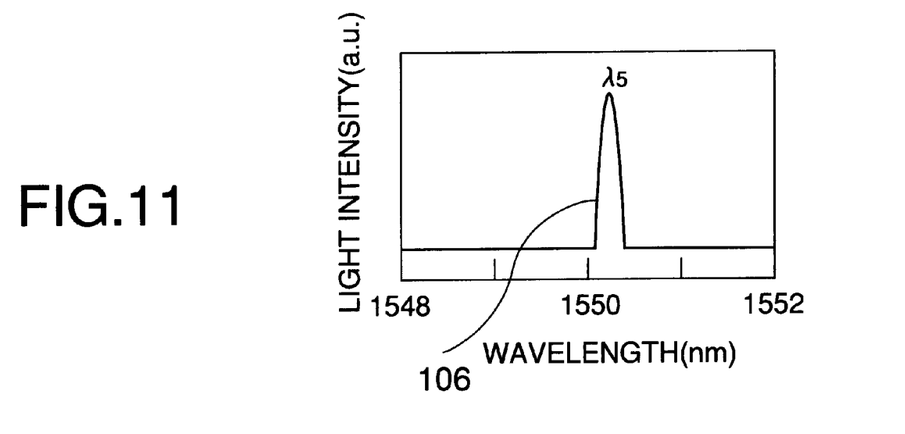
Figure 12:
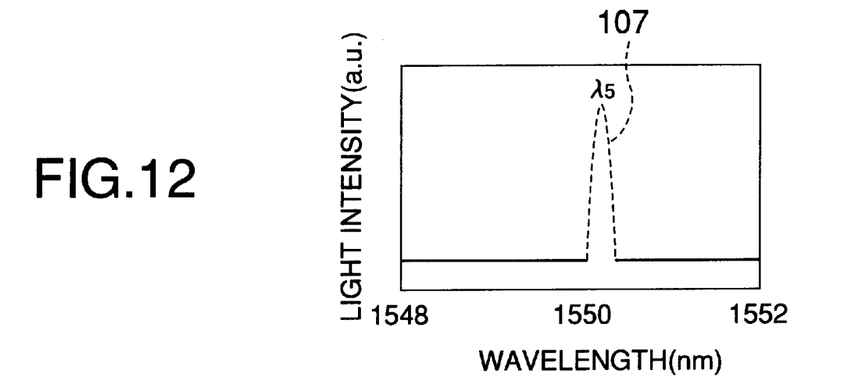
Figure 13:
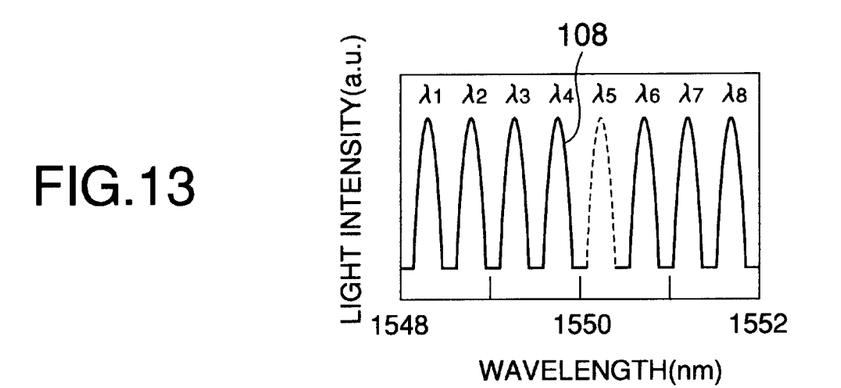

FIGS. 10 to 13 are graphs showing the operation of the third embodiment. FIG. 10 is a graph showing a waveform 105 of light beams having wavelengths λ1 to λ8, which are inputted through a first port 15. FIG. 11 is a graph showing a waveform 106 of light having the wavelength λ5, which is outputted from a second port 16. FIG. 12 is a graph showing a waveform 107 of light having the wavelength λ5, which is input through a third port 17. FIG. 13 is a graph showing a waveform 108 of light beams having the wavelengths λ1 to λ8, which are outputted from a fourth port 18.

The reflection wavelength λB of the first and second diffraction gratings 26 and 27 is set to be equal to the wavelength λ5. Of the light beams inputted through the first port 15, the light beam having the wavelength λ5 is reflected by the first diffraction grating 26 and is demultiplexed/outputted from the second port 16. The light beams other than the light beam having the wavelength λ5 pass through the first and second diffraction gratings 26 and 27 and are outputted from the fourth port 18 because the directional coupling section 25 has a length three times the complete coupling length.

When light having the wavelength λ5 is newly inputted through the third port 17, an output multiplexed with the light having the wavelength λ5 can be obtained from the fourth port 18.

In the third embodiment, the two diffraction gratings 26 and 27 are used to multiplex and demultiplex light. However, similar characteristics can also be obtained by using one diffraction grating. In addition, by using a diffraction grating having a plurality of reflection wavelength characteristics, light beams having different wavelengths can be simultaneously multiplexed/demultiplexed.

Figure 14:
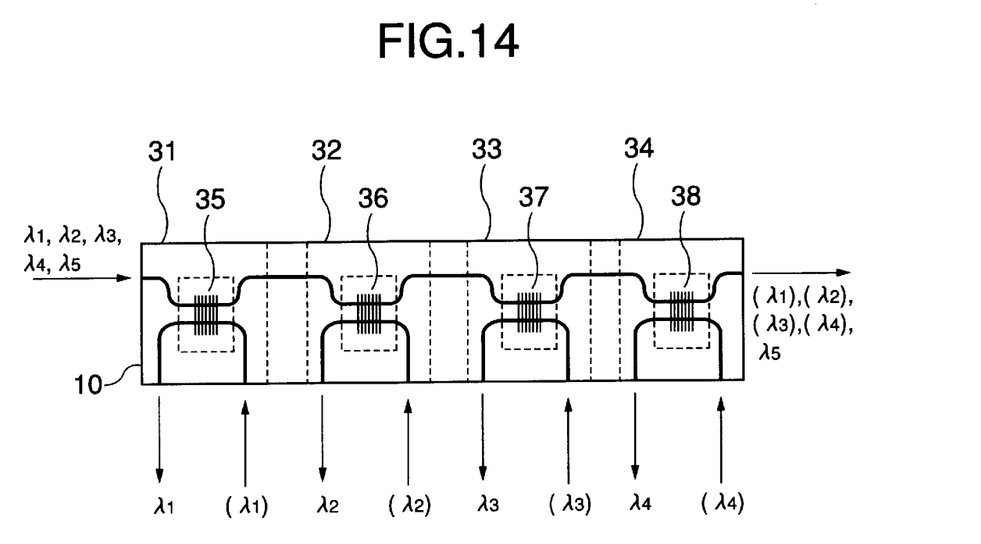
FIG. 14 is a plan view showing the schematic arrangement of the fourth embodiment of the present invention.
Figure 15:
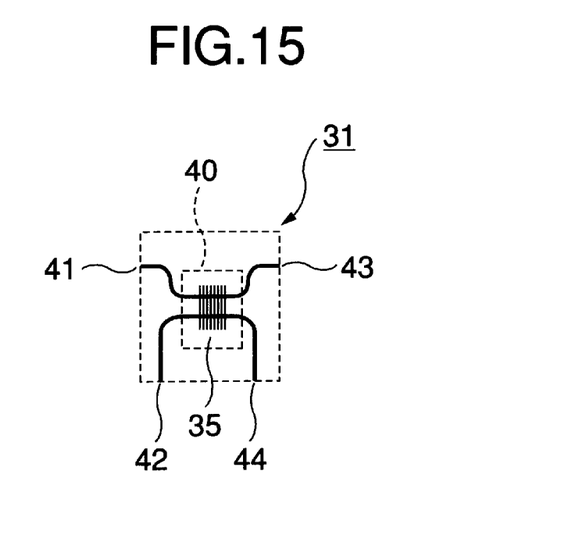
FIG. 15 is a plan view showing the schematic arrangement of a unit optical multi/demultiplexer in the embodiment shown in FIG. 14.

The fourth embodiment of the present invention will be described next. FIG. 14 is a plan view showing the schematic arrangement of the fourth embodiment. FIG. 15 is a plan view showing the schematic arrangement of a unit optical multiplexer as a part of an optical circuit device. Note that the same reference numerals in FIGS. 14 and 15 denote the same parts as in FIG. 4, and a description thereof will be omitted.

In the optical circuit device shown in FIG. 14, four unit optical multi/demultiplexers 31 to 34 are formed on a substrate 10. A third port 43 of each preceding unit optical multi/demultiplexer is connected in series with a first port 41 of each succeeding unit optical multi/demultiplexer.

As shown in FIG. 15 (showing the unit optical multi/demultiplexer 31 as an example), each unit optical multi/demultiplexer includes four ports, i.e., the first port 41, a second port 42, the third port 43, and a fourth port 44, a directional coupling section 40 having a length twice the complete coupling length, and a diffraction grating 35, 36, 37, or 38.

The reflection wavelengths of the first, second, third, and fourth diffraction gratings 35 to 38 are respectively set to λ1, λ2, λ3, and λ4.

When light beams having the five wavelengths, i.e., the wavelengths λ1 to λ5, are inputted through the first port 42 of the first unit optical multi/demultiplexer 31, the respective light beams are reflected by the diffraction gratings 35 to 38 and are respectively outputted from the second ports 42 of the unit optical multi/demultiplexers 31 to 34. Only the light beam having the wavelength λ5 is outputted from the third port 43 of the fourth unit optical multi/demultiplexer 34.

The light beams (λ1 to λ4) respectively inputted through the fourth ports of the unit optical multi/demultiplexers 31 to 34 are reflected by the diffraction gratings 35 to 38 and multiplexed with the output from the third port 43 of the fourth unit optical multi/demultiplexers 34.

In the optical circuit device of the fourth embodiment, light beams having different wavelengths can be multiplexed and demultiplexed on a single device.

Figure 16:
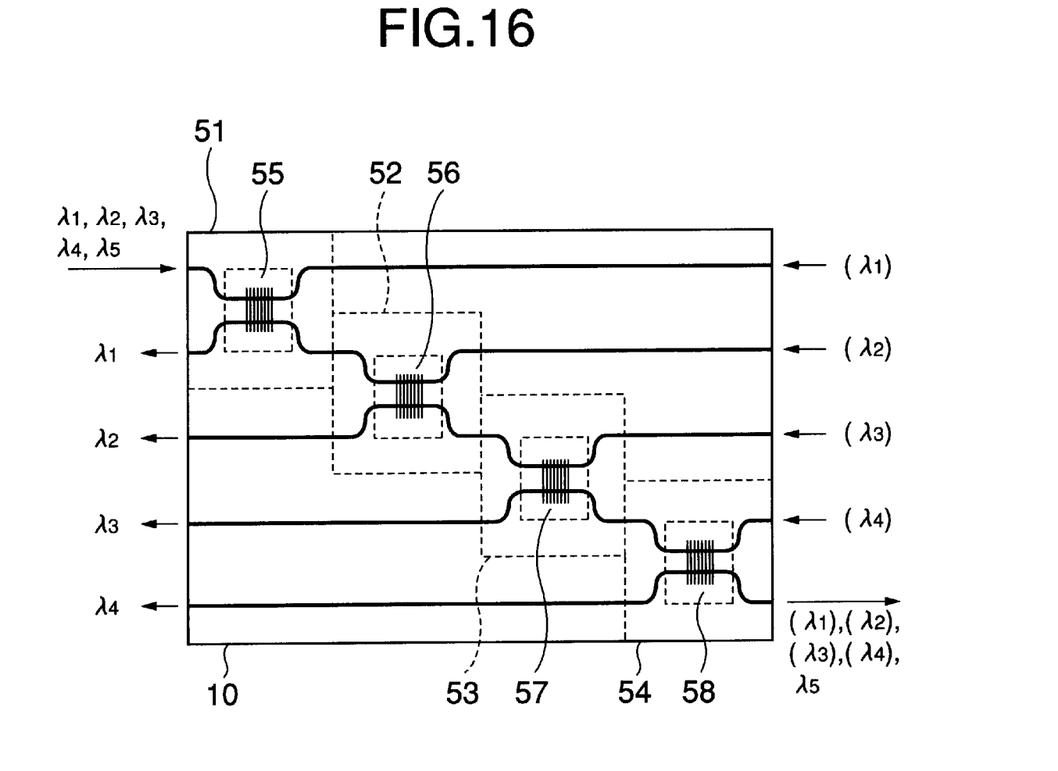
FIG. 16 is a plan view showing the schematic arrangement of the fifth embodiment of the present invention.
Figure 17:
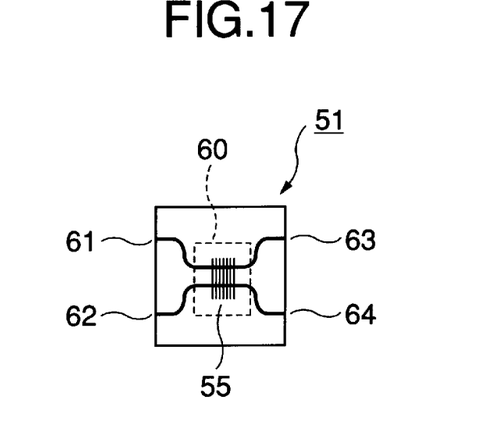
FIG. 17 is a plan view showing the schematic arrangement of a unit optical multi/demultiplexer in the embodiment shown in FIG. 16.

The fifth embodiment of the present invention will be described next. FIG. 16 is a plan view showing the schematic arrangement of the fifth embodiment. FIG. 17 is a plan view showing the schematic arrangement of a unit optical multi/demultiplexer as a part of an optical circuit device. The same reference numerals in FIGS. 16 and 17 denote the same parts as in FIG. 4, and a description thereof will be omitted.

In the optical circuit device shown in FIG. 16, four unit optical multi/demultiplexers 51 to 54 are formed on a substrate 10. A fourth port 64 of each preceding unit optical multi/demultiplexer is connected in series with a first port 61 of each succeeding unit optical multi/demultiplexer.

As shown in FIG. 17 (showing the unit optical multi/demultiplexer 51 as an example), each unit optical multi/demultiplexer includes four ports, i.e., the first port 61, a second port 62, a third port 63, and the fourth port 64, a directional coupling section 60 having a length three times the complete coupling length, and a diffraction grating 55, 56, 57, or 58.

The reflection wavelengths of the first to fourth diffraction gratings 55 to 58 are respectively set to λ1, λ2, λ3, and λ4.

In the optical circuit device of the fifth embodiment, when light beams having the five wavelengths λ1 to λ5 are inputted through the first port 61 of the first unit optical multi/demultiplexer 51, the respective light beams are reflected by the diffraction gratings 55 to 58 and outputted from the second ports 62 of the unit optical multi/demultiplexers 51 to 54. Only the light beam having the wavelength λ5 is outputted from the fourth port 64 of the fourth unit optical multi/demultiplexer 54.

Light beams having the wavelengths λ1 to λ4 inputted through the third ports 63 of the unit optical multi/demultiplexers 51 to 54 are respectively reflected by the diffraction gratings 55 to 58 and are multiplexed/outputted from the fourth port 64 of the fourth diffraction grating 58. According to the optical circuit device of the present invention, similar to the optical circuit device described above, light beams having different wavelengths can be multiplexed and demultiplexed on a single device.

Figure 18:
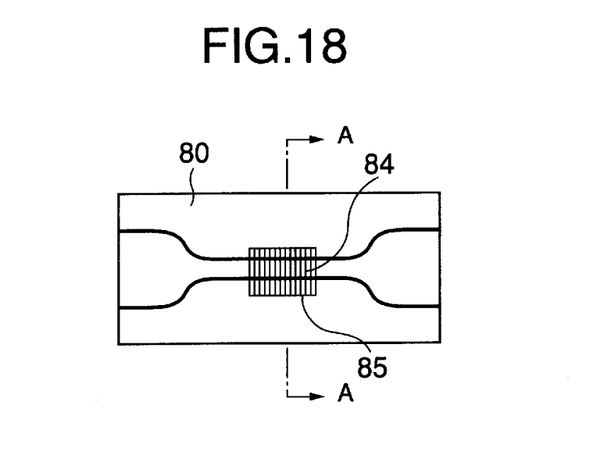
FIG. 18 is a plan view showing the schematic arrangement of the sixth embodiment of the present invention.
Figure 19:
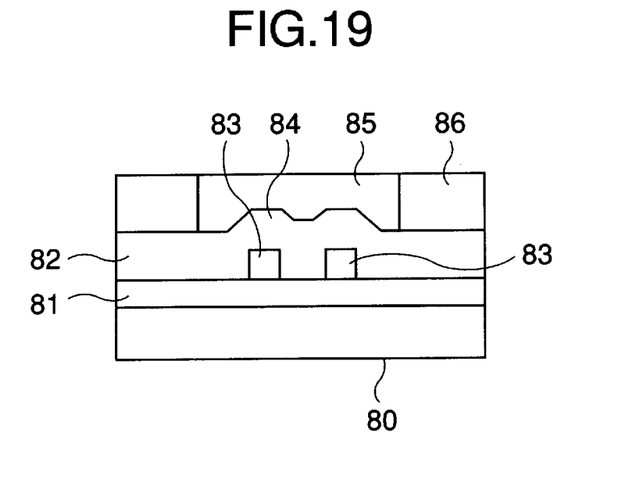
FIG. 19 is a sectional view showing the schematic arrangement of the sixth embodiment of the present invention.

The sixth embodiment of the present invention will be described next. FIG. 18 is a plan view showing the schematic arrangement of the sixth embodiment. FIG. 19 is a sectional view taken along a line A—A in FIG. 18.

In the optical circuit device of the sixth embodiment, a mask layer 86 having an opening 85 is formed on an optical waveguide which is formed on a substrate 80 and constructed by an upper cladding 82, a lower cladding 81, cores 83, and a diffraction grating 84.

The opening 85 is formed above the portion where the diffraction grating 84 is formed. The mask layer 86 is made of chromium. When the diffraction grating 84 is to be formed by ultraviolet irradiation, the mask layer 86 prevents ultraviolet rays from being reflected or absorbed by portions other than the portion where the diffraction grating 84 is formed.

In the sixth embodiment, the mask layer is made of chromium. However, this layer can be made of another material, such as gold or titanium oxide.

In each optical multi/demultiplexer using the above directional coupling section, a deterioration in characteristics is caused by a positional offset of the diffraction grating with respect to the directional coupling section. To prevent this, the present invention is used to accurately determine the forming position of the diffraction grating with the mask layer, thereby realizing an optical multi/demultiplexer with little deterioration in characteristics.

What is claimed is:

1. An optical circuit device comprising:

a directional coupling section comprised of first and second optical waveguides and having a length n times (n is an integer of two or more) a minimum length required to completely couple light inputted to said first optical waveguide to said second optical waveguide, and at least one diffraction grating formed in said directional coupling section and having a specific reflection characteristic, wherein when input light beams having different wavelengths are input to an input side of said first optical waveguide, light having a reflection wavelength in said diffraction grating is demultiplexed/outputted to an input side of said second optical waveguide, and light beams having other wavelengths other than said reflection wavelength are outputted to an output side of said first or second optical waveguide, and when the light having the reflection wavelength in said diffraction grating is inputted through one of the output sides of said first and second optical waveguides from which the light beams having other wavelengths are not outputted, the light having the reflection wavelength inputted through the output side of said optical waveguide is multiplexed with the output light beams having other wavelengths, wherein LG20=the length of the at least one diffraction grating, L19=the length of the directional coupling section, dΦ is the phase difference between even and odd modes of light reflected by the at least one diffraction grating, and kc is the coupling coefficient of the directional coupling section, and wherein $$LG20 = L19 - \frac{\pi - d\varphi}{2kc}.$$

2. A device according to claim 1, wherein when n is an even number, the light beams having other wavelengths are outputted to the output side of said first optical waveguide, and when the light having the reflection wavelength in said diffraction grating is inputted through the output side of said second optical waveguide, the light which has the reflection wavelength and is inputted through the output side of said second optical waveguide is multiplexed with the light beams which have other wavelengths and are outputted from the output side of said first optical waveguide.

3. A device according to claim 2, wherein said device further comprises a plurality of directional coupling sections, each identical to said directional coupling section, and a plurality of diffraction gratings formed in the respective directional coupling sections and having different reflection characteristics, and an output side of a preceding first optical waveguide is connected to an input side of a succeeding first optical waveguide.

4. A device according to claim 1, wherein when n is an odd number, the light beams having other wavelengths are outputted to the output side of said second optical waveguide, and when the light having the reflection wavelength is inputted through the output side of said first optical waveguide, the light which has the reflection wavelength and is inputted through the output side of said first optical waveguide is multiplexed with the light beams which have other wavelengths and are outputted from the output side of said second optical waveguide.

5. A device according to claim 4, wherein said device further comprises a plurality of directional coupling sections, each identical to said directional coupling section, and a plurality of diffraction gratings formed in the respective directional coupling sections and having different reflection characteristics, and an output side of a preceding second optical waveguide is connected to an input side of a succeeding first optical waveguide.

6. A device according to claim 1, further comprising a mask layer having an opening in that portion on said optical waveguide in which said diffraction grating is formed.

7. A device according to claim 6, wherein said mask layer is made of a material that reflects or absorbs ultraviolet rays.

8. A device according to claim 6, wherein said mask layer is made of a material selected from the group consisting of gold, chromium, and titanium.

* * * * *